United States Patent [19]
Williams et al.

[11] Patent Number: 6,116,539
[45] Date of Patent: Sep. 12, 2000

[54] AEROELASTICALLY STABLE FORWARD SWEPT WING

[75] Inventors: Samuel B. Williams, Bloomfield Hills; John F. Jones, Berkley, both of Mich.

[73] Assignee: Williams International Co. L.L.C., Walled Lake, Mich.

[21] Appl. No.: 09/272,435

[22] Filed: Mar. 19, 1999

[51] Int. Cl.$^7$ ........................................................ B64C 3/26
[52] U.S. Cl. ........................ 244/46; 244/35 R; 244/45 R; 244/123; 244/124
[58] Field of Search ................................... 244/46, 35 R, 244/123, 124, 45 R

[56] References Cited

U.S. PATENT DOCUMENTS

| | | | |
|---|---|---|---|
| 2,122,709 | 7/1938 | Barkley | 244/123 |
| 3,002,717 | 10/1961 | Pavlecka | 244/124 |
| 3,775,238 | 11/1973 | Lyman | 244/123 |
| 3,827,661 | 8/1974 | Ryan et al. | 244/123 |
| 4,417,708 | 11/1983 | Negri | 244/45 R |
| 4,741,497 | 5/1988 | Fox | 244/123 |
| 5,332,178 | 7/1994 | Williams | 244/123 |
| 5,501,414 | 3/1996 | Bauer | 244/124 |
| 5,806,798 | 9/1998 | Gillandt et al. | 244/123 |

*Primary Examiner*—J. Woodrow Eldred
*Attorney, Agent, or Firm*—Lyon, P.C.

[57] ABSTRACT

The instant invention generally relates to a forwardly swept wing 10 for an aircraft comprised of a pair of opposed single piece machined aluminum alloy wing boxes 20 and 40. Specifically, the invention provides for a forward swept wing construction utilizing known in the art computer numerical control machining techniques to produce an aluminum alloy wing 10 having an integral leading edge 24 thereby greatly reducing assembly time. A plurality of integral stiffeners 80 oriented at a forwardly swept angle of approximately 12 to 13 degrees between forward 62 and rear 64 spars provides for a wing 10 that minimizes the effects of aeroelastic divergence.

18 Claims, 4 Drawing Sheets

AEROELASTICALLY STABLE FORWARD SWEPT WING

BACKGROUND OF THE INVENTION

The instant invention relates to an aircraft wing constructed from a plurality of aluminum alloy workpieces. More particularly, a pair of opposed top and bottom wing boxes are machined from single pieces of aluminum alloy. Each wing box has a wing skin surface integral with stiffeners and ribs to provide a tailored stiffness wing construction. The machined wing skin surfaces provide for a very smooth and accurate air flow over the wing.

Conventional aircraft wing construction generally comprises one or more spars or spar webs that extend laterally relative to the longitudinal axis of the airframe for the support of a plurality of longitudinally extending laterally spaced ribs that define the shape of the air foil. Vertical web portions of the spars carry shear loads imposed on the wing and the upper and lower wing skins act as flanges that sustain the wing under bending and torsional loads.

A variation on the aforementioned conventional aircraft wing construction is taught in Barkley, U.S. Pat. No. 2,122,709. Barkley discloses a wing constructed of a plurality of laterally extending webs that support the wing skins in a manner that makes it unnecessary to utilize longitudinally extending ribs. The Barkley wing configuration, however, does nothing to solve the problem known as aeroelastic divergence. Aeroelastic divergence occurs when a forward swept wing bends upwardly due to high angles of attack or gust loads. Because of the forward sweep geometry of the wing, the resultant torsional deflection increases the angle of attack of the wing. The increase in angle of attack of the wing increases aerodynamic load still further causing yet additional increases in the angle of attack. This self-propagating "divergence" can lead to structural damage or failure of the wing. Additionally, the Barkley wing configuration does not allow for the use of composite materials in wing construction.

U.S. Pat. No. 5,332,178 to Williams, and assigned to the assignee of the instant invention, addresses the problem of aeroelastic divergence by providing for an aircraft wing construction having a plurality of elongated hollow spars arranged in a generally parallel relation in an array to define the surface of an airfoil with a composite skin disposed about the assembled spars. The fiber reinforced spar configuration, coupled with orientation of composite fibers within the wing skin alters the elastic configuration of the wing wherein an increase in aerodynamic load twists the wing in a direction so as to reduce the angle of attack of the wing thereby reducing aerodynamic load under turbulent conditions.

The Williams wing configuration, however, does not provide for the use of traditional wing construction materials, resulting in a composite material wing that is quite expensive and labor intensive. The instant invention provides for an aircraft wing that is constructed from a pair of aluminum alloy wing boxes shaped by known-in-the-art machine tool processes, thereby dramatically reducing the labor required for operations such as riveting and welding in conventional wing construction, or fiber lay-up in composite wing construction. In addition to the reduction in labor costs, the instant invention provides for extremely accurate wing skin surfaces, thereby minimizing aerodynamic drag and the attendant costs thereof.

SUMMARY OF THE INVENTION

The instant invention solves the aforementioned problems by providing an aircraft wing constructed from opposed upper and lower aluminum alloy wing boxes. Both the upper and lower wing boxes comprise a single piece of aluminum alloy that is shaped using commercially available computer numerical control machine tools.

Each opposing wing box is machined from a sheet or plate of aluminum (or an equivalent alloy) having a thickness of approximately 1½ to 2 inches. The aluminum workpieces are formed to approximate the required wing shape prior to initiation of the machining process to eliminate excessive waste of stock. In particular, the airfoil surfaces of each wing box are formed to require the absolute minimum of machining by, for example, casting or bending the workpieces to provide a curvature thereto approximating the desired shape of the finished airfoil surfaces.

The upper surface of the upper wing box and the lower surface of the lower wing box are machined to define the upper and lower wing skins respectively. After the wing skins are machined into the wing boxes, adequate stock must remain on the workpiece to form the interior structure of the wing on opposing sides of each wing box, as explained hereinbelow.

The upper surface of the upper wing box is machined to include an integral leading edge having an upper portion and a lower portion terminating at a point just below the stagnation region of the wing. Both wing boxes terminate at a trailing edge having bosses or flanges thereon as necessary to secure ailerons and/or trailing edge flaps.

Once the wing skin surfaces are machined, the wing boxes are rotated to machine the interior portions thereof. The wing skin surfaces are held by a suitable non-deforming means, for example, a shaped fixture having a plurality of holes therein and a means for evacuating air from the holes to draw a vacuum. The wing skin surfaces are mated precisely with the shaped fixture and the plurality of holes are then evacuated, thereby securing the wing box against the fixture by operation of vacuum pressure.

The interiors of the wing boxes are then machined utilizing the aforementioned computerized numerically controlled machine tool. As the interior side of each wing box is machined, all excess aluminum stock is removed thereby leaving the wing structure in place, integral to the wing skin. The remaining thickness of the wing skin (airfoil surface) is ⅛ to 1/32 inches. This thickness may be optimized to provide for the lightest possible wing while providing a wing skin resistive to localized denting. Additionally, the wing skins may be thicker in localized areas, for example, proximate the wing root, to provide greater dissipation of stress therethrough.

Each opposed wing box interior is comprised of a forward spar extending laterally from the aircraft from the wing root to the wing tip. The forward spars are machined to utilize the maximum thickness of the wing box work piece. In accordance with an alternative embodiment of the instant invention, wherein the leading edge portion is not integral to the upper wing box, the forward spars may include a rabbeted portion therein to engage a separately fabricated leading edge.

A rear spar is machined into each opposing wing box interior substantially parallel to the forward spar and extending laterally from the aircraft from the wing root to the wing tip. The rear spar defines the trailing edge of the wing.

A plurality of integral stiffeners are machined into the wing box between the forward and rear spars. To prevent aeroelastic divergence of a forwardly-swept aircraft wing, the stiffeners are arranged between the spars at an angle of 12 to 13 degrees to the mean chord line of the wing, thereby providing for a wing having tailored stiffness characteristics. The stiffeners are spaced from each other to provide for optimum wing stiffness depending upon design stress requirements while minimizing wing weight. Additionally, the stiffeners may have integral fillets or end caps disposed along their interior edges, to provide additional strength to the wing structure.

A plurality of integral ribs are machined into the interior surface of each wing box extending between the forward and rear spars at an angle of approximately 90 degrees to the mean chord line of the wing. These ribs intersect the stiffeners at a plurality of points throughout the wing box interior and provide strength to the stiffeners to prevent the buckling thereof at high wing stress levels. The ribs can further comprise integral fillets or end caps disposed along their interior edges similar to the stiffener end caps.

Both the upper and lower wing box ribs and stiffeners are further provided with a plurality of holes therein to allow the wing to be utilized as a fuel tank. For wings having a positive dihedral, the plurality of holes in the ribs and stiffeners allow fuel to flow towards the root of the wing.

The opposed upper and lower wing boxes are then co-joined by conventional or laser welding the upper wing box rear spar to the lower wing box rear spar and the upper wing box forward spar to the lower wing box forward spar. In joining the forward spars, an intermediate spar or filler segment is disposed therebetween to enhance the thickness of the forward portion of the wing, as well as the root portion thereof. The upper and lower forward spars are each welded to the intermediate spar. The use of the intermediate spar allows the wing box work pieces to have a substantially smaller thickness, thereby minimizing material cost.

The shaped trailing edge flaps and/or ailerons of the wing are then riveted, bolted, or welded into place. Both the upper and lower wing boxes are further provided with a plurality of bosses or flanges proximate the rear spar for securing the aircraft control flaps and/or ailerons thereto.

The integral leading edge of the wing has a removable panel portion secured thereto that extends substantially the entire length of the wing on the lower portion of the leading edge just below the stagnation region thereof. The panel portion is secured to both the integral leading edge and lower wing box with screws, rivets, or similar fasteners for easy access to the interior of the wing. The channel formed within the interior of the wing by the leading edge and the opposing forward spars provides an area for the installation of aircraft wiring, lights and deicing equipment. The removable panel portion provides for simplified access to the channel extending along the leading edge of the wing for inspection of welds and vehicle maintenance.

In an alternative embodiment of the instant invention wherein the leading edge is not integral to the upper wing box, a splice plate having a laterally extending flange is riveted or screwed to the forward spars of both wing boxes to form a fuel tight joint proximate the forward spars. A separately fabricated leading edge is then riveted flush to the upper and lower wing boxes so that the leading edge is flush with the upper and lower wing skins.

Both the upper and lower wing boxes are further provided with a plurality of integral reinforcing ribs extending from the wing root at oblique angles to the plurality of stiffeners. The reinforcing ribs are necessary to distribute the stress from the root of the wing into the integral stiffeners. The wing skin is machined to be slightly thicker proximate the reinforcing ribs to allow for the dissipation of greater stress through the root of the wing.

In another alternative embodiment of the instant invention, a plurality of carry-through beams are machined into each wing box. The carry through beams extend laterally from the wing root into the fuselage of the aircraft to provide attachment of the wings to the aircraft. Opposed carry-through beams of the upper and lower wing boxes have a filler segment disposed therebetween to secure the beams together. The carry-through beams extending from wing boxes on opposite sides of the aircraft fuselage are provided with a slight offset, either aft or forward of a line normal to the centerline of the aircraft, to allow the carry-through beams extending into the fuselage from one wing to be secured to the carry-through beams extending from the opposite wing. This feature of the invention assures a very stiff aircraft wing assembly that extends through the fuselage.

It is therefore one object of the instant invention to provide a forward swept aircraft wing that is not susceptible to the phenomenon of aeroelastic divergence, thereby providing a reduced aircraft response to turbulence when encountered.

It is a further object of the instant invention to provide a forward swept aircraft wing comprised of a pair of aluminum alloy wing boxes and shaped utilizing a high speed machining process. By constructing a wing having very few parts, labor and maintenance costs are thereby minimized.

A yet further object of the invention is to provide a forward swept aircraft wing comprised of an aluminum alloy having a minimized design weight by removing all extraneous material from the opposing wing boxes during the machining process.

Additional objects, features, and advantages of the present invention will become apparent from the subsequent detailed description, taken in conjunction with the accompanying drawing figures.

BRIEF DESCRIPTION OF THE DRAWINGS

FIG. 4 is a detail view of a wing interior.

DETAILED DESCRIPTION OF THE PREFERRED EMBODIMENT(S)

Figures 1, 3:
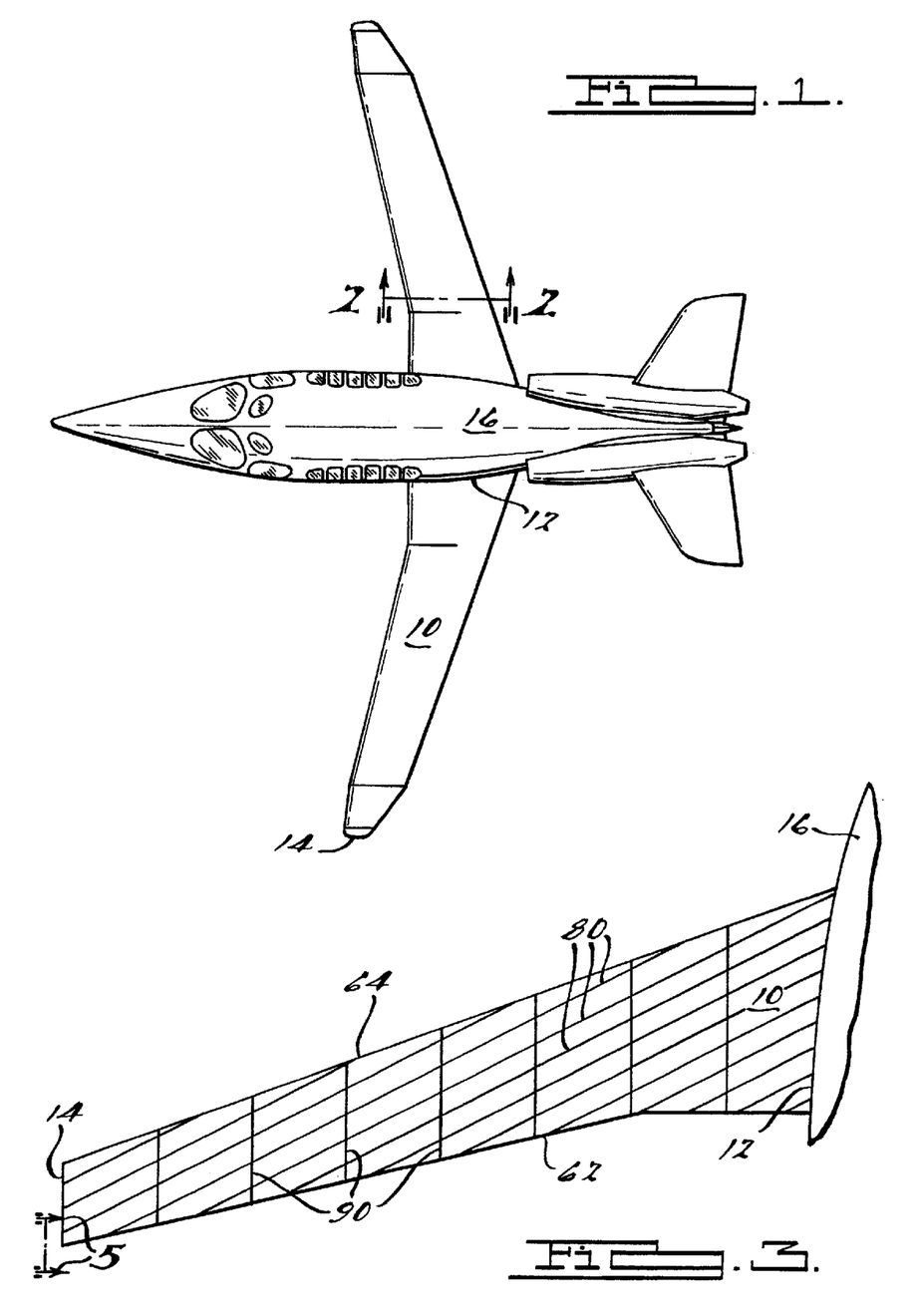
FIG. 1 is a top plan view of an aircraft employing forward swept wings in accordance with the present invention.
FIG. 3 is a top plan view of a wing broken open for clarity.
Figure 2:
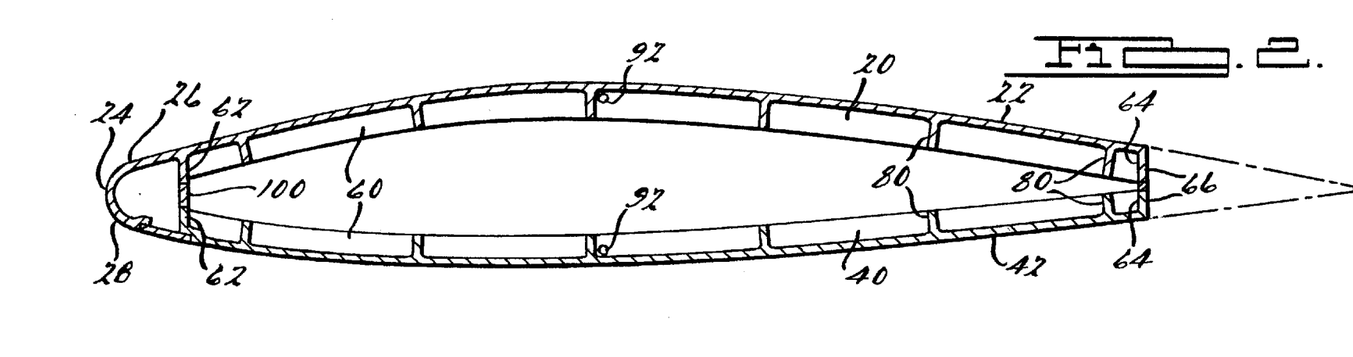
FIG. 2 is a view of the aircraft wing taken along the line 2—2 of FIG. 1.
Figure 3:
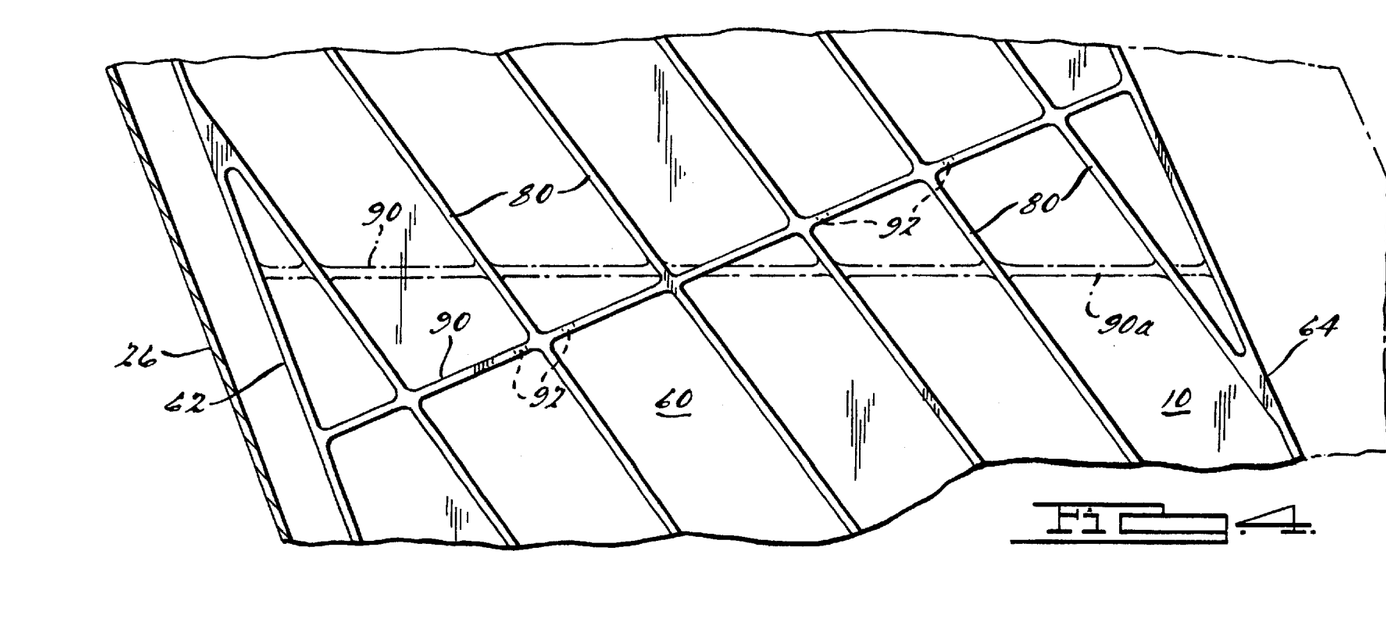

Referring to drawing FIGS. 1 and 2, and in accordance with the preferred embodiment of the instant invention, a forward swept aircraft wing 10 having a root 12 and a tip 14 for minimizing the effects of turbulent air thereon, comprises an opposed pair of upper and lower wing boxes, 20 and 40 respectively, each machined from a single workpiece of high-strength aluminum alloy. The aluminum alloy workpieces have a maximum thickness of 2" and are formed to approximate the shape of the finished wing 10 prior to initiating the machining process. The machining of both the upper 20 and lower 40 wing boxes is accomplished utilizing known-in-the-art computer numerically controlled machine tooling appropriately programmed for optimal efficiency. An alloy workpiece formed to approximate the desired exterior wing 10 shape guarantees a minimum amount of wasted stock in the machining process.

Initially the upper surface of the upper wing box 20 is shaped by the machine tool to define the upper wing skin 22. Similarly, the lower surface of the lower wing box 40 is shaped to define the lower wing skin 42. In a preferred embodiment of the instant invention, the upper wing skin 22 includes an integral leading edge 24 of the wing 10, extending to a point just below the stagnation region thereof, as shown in FIG. 2. The integral leading edge 24 includes both an upper portion 26 integral to the upper wing skin 22, and a lower rabbeted portion 28 that terminates on the underside of the aircraft wing 10 just below the stagnation region thereof. The lower rabbeted portion 28 of the leading edge 24 extends substantially the entire length of the wing 10 from the root 12 to the tip 14.

This feature of the instant invention allows the leading edge portion 26 and the upper wing skin 22 to be comprised of a continuous piece of alloy material devoid of seams and rivets, thereby reducing both aerodynamic drag and assembly time. It is important, however, that adequate stock remain on each wing box 20 & 40 subsequent to machining the wing skins 22 & 42 to allow the interior of each wing box to be machined therein, as explained hereinbelow.

After machining both the upper and lower wing skins 22 and 42, the wing box interiors are machined utilizing the aforementioned computerized machine tool. The wing skin surfaces 22 and 42 are positioned on a suitable fixture having, for example, mirror image surfaces of the wing skins 22 and 42. The fixture surfaces further have a plurality of holes therein and a means for evacuating the air from the holes. The wing skins 22 and 42 of each wing box 20 and 40 are positioned on the respective mirror image surfaces of the fixtures, and the plurality of holes are then evacuated to secure the wing skins 22 and 42 to the fixture by operation of vacuum pressure. Alternatively, excess alloy stock may be provided along the root 12 of the wing boxes 20 and 40 to secure the boxes for purposes of machining the interiors thereof. Upon completion of the machining process, the excess stock is removed.

As shown in FIGS. 2, 3 & 4, each wing box 20 and 40 has an interior portion 60 comprising a forward spar 62 extending laterally from the aircraft fuselage 16 substantially along the entire length of the wing 10 from root 12 to tip 14, proximate the leading edge 26 thereof. The wing box 20 is thickest along the lateral line defined by the forward spars 62, and therefore the forward spars 62 utilize the maximum thickness of the wing box workpieces.

Figure 5:
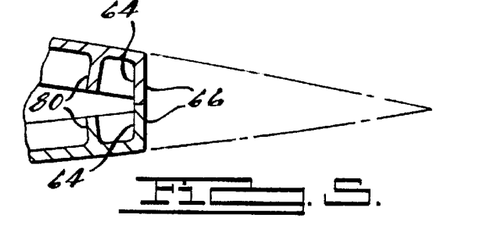
FIG. 5 is a view taken along line 5—5 of FIG. 3.

Similarly, each wing box interior 60 further comprises a rear spar 64 machined therein and disposed in generally parallel spaced relation to the forward spar 62. The rear spars 64 extend laterally from the wing root 12 to the wing tip 14. As shown in FIG. 5, and in accordance with a preferred embodiment of the instant invention, the rear spars 64 include a plurality of bosses 66 thereon for securing aircraft control flaps or ailerons thereto.

Figure 6:
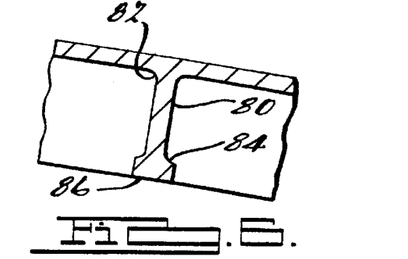
FIG. 6 is a cross-sectional view of a wing stiffener taken along the line 6—6 of FIG. 4 in accordance with an alternative embodiment of the instant invention.
Figure 7:
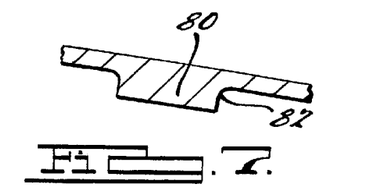
FIG. 7 is a cross-sectional view of a wing stiffener similar to that of FIG. 6 in accordance with an alternative embodiment of the instant invention.

Furthermore, a plurality of integral stiffeners 80 having exterior edges 82 integral to the wing skins 22 and 24, and interior edges 84 are machined into the wing boxes 20 and 40 and are disposed between the forward 62 and rear 64 spars. The stiffeners 80 are arranged at an angle of twelve degrees to the mean chord line of the wing 10 to provide tailored stiffness thereto. The stiffeners 80 lie in parallel spaced relation to each other to provide stiffness along the entire length of the wing 10. In an alternative embodiment of the instant invention as shown in FIGS. 6 & 7, the stiffeners 80 can further comprise an integral end cap portion 86 disposed along the interior edge 84 thereof, wherein the end cap portion 86 provides additional rigidity and strength to each stiffener 80.

Referring again to FIGS. 2, 3 & 4, a plurality of integral ribs 90, each having a plurality of holes 92 therein, are machined into the wing box interiors 60. Each rib 90 is disposed between the forward 62 and rear 64 spars at an angle of approximately 90 degrees to the mean chord line of the wing. The ribs 90 intersect the stiffeners 80 at a plurality of points in the interior 60 of each wing box 20 and 40 and provide a means for dissipation of stress through the stiffeners 80 to prevent the buckling thereof under high wing 10 loads. In an alternative embodiment of the instant invention as shown in FIG. 4, a plurality of ribs 90a are disposed parallel to the centerline of the fuselage 16 between the forward 62 and rear 64 spars.

Figure 8:
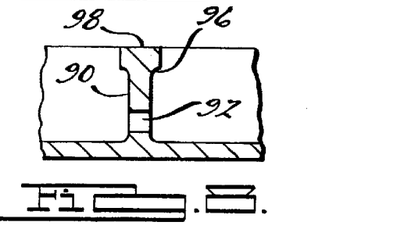
FIG. 8 is a cross-sectional view of a wing rib taken along the line 8—8 of FIG. 4 in accordance with an alternative embodiment of the instant invention.

In yet another alternative embodiment of the instant invention as seen in FIG. 8, the ribs 90 can further comprise an integral end cap portion 98 disposed along an interior edge 96 of the ribs 90 to provide additional rigidity and strength to each rib 90.

The plurality of holes 92 disposed in each rib 90 provide for the venting and draining of fuel in aircraft utilizing the interior of the wings 10 for fuel storage. This feature of the instant invention is useful for aircraft wings 10 having either positive or negative dihedral. The plurality of holes 92 allow fuel to flow towards the root 12 or tip 14 of each wing 10 to any of various known-in-the-art fuel pickups.

Figure 9:
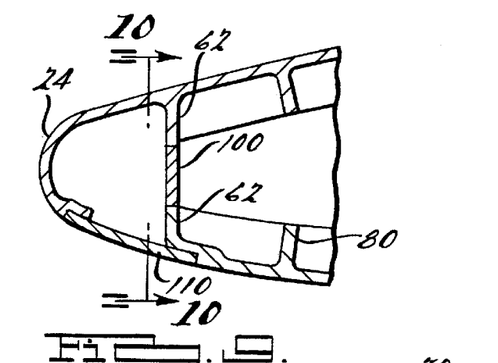
FIG. 9 is a detail view of the wing leading edge and forward spars in accordance with the instant invention.

The opposed upper 20 and lower 40 wing boxes are positioned so that the forward 62 and rear 64 spars are juxtaposed, and then co-joined by welding techniques amenable to use with lightweight aluminum alloys. Alternatively, laser welding techniques are employed to weld the wing boxes 20 and 40 together in applications wherein an alloy amenable to laser welding is utilized. Due to the thickness of the wing 10 at the leading edge 24 and proximate the root 12 thereof, and as best seen in FIGS. 2 & 9, a plurality of shaped intermediate spars 100 are disposed between opposed upper and lower forward spars 62 to increase the overall thickness of the wing 10. This feature of the instant invention allows the alloy workpiece to have only the thickness necessary to form the ribs 90, stiffeners 80, and spars 62 and 64 respectively, thereby reducing material cost and machining time.

Figures 10, 11:
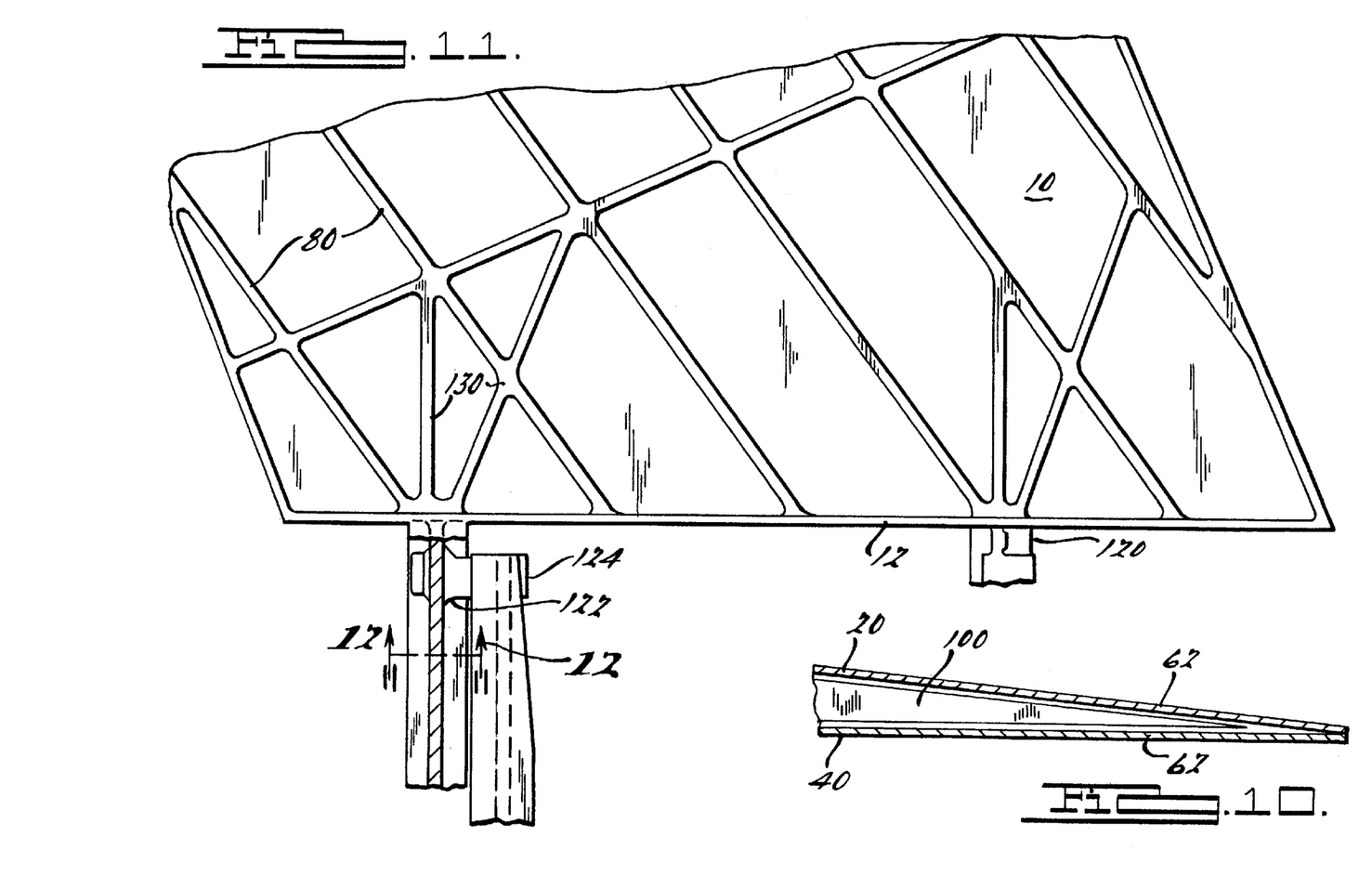
FIG. 10 is a view taken along line 10—10 of FIG. 9.
FIG. 11 is a detail view of the wing interior and alternative attachment system at the root thereof.

The intermediate spars 100, as shown in FIG. 10, have a tapered thickness and are interposed between the forward spars 62 of the upper and lower wing boxes 20 and 40, and the rear spars 64 of the upper and lower wing boxes 20 and 40. The intermediate spars 100 are welded therebetween to secure the upper wing box 20 and lower wing box 40 together and provide the wing 10 with the desired overall thickness. The intermediate spars 100 have a tapered width terminating at a point proximate the wing tip 12, where the wing 10 thickness is small enough to allow the forward 62 and rear 64 spars of both wing boxes 20 and 40 to be welded directly together.

Next, the shaped trailing edges of the wing 10 are secured to the assembled upper 20 and lower 40 wing boxes utilizing the plurality of bosses 66 disposed on the rear spars 64 thereof, for securing wing flaps and/or ailerons. The flaps and ailerons are secured to the bosses 66 by conventional fastening means such as screws, rivets, or alternatively, welds.

In one embodiment of the instant invention as depicted in FIG. 9, wherein the leading edge 24 of the wing 10 is integral to the upper wing box 20, a panel portion 110 is further provided that extends laterally substantially the entire length of the wing 10 between the lower wing box 40 forward spar 62 and the leading edge 24 of the upper wing box 20. The panel portion 100 is secured to the lower rabbeted portion 28 of the leading edge 24 and to the forward spar 62 of the lower wing box 40 by screws or equivalent removable fasteners so that the panel portion 110 may be easily removed. This feature of the instant invention allows the panel portion 110 to be removed thereby providing access to a channel defined by the forward spars 62, the leading edge 24, and the aforementioned panel portion 110. The resulting channel can contain aircraft wiring, lights, deicing equipment, and other aircraft flight systems and provide the ability to visually inspect the forward spar 62 welds. Alternatively, the panel portion 110 is secured by rivets or welds in applications where access to the channel is not desired.

Figure 12:
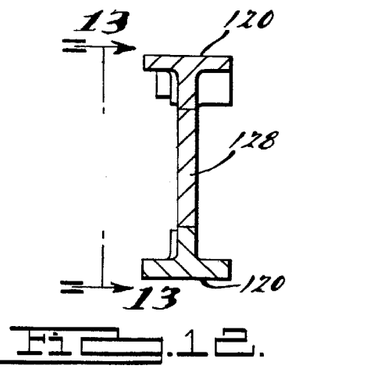
FIG. 12 is a view of the instant invention taken along the line 12—12 of FIG. 11.
Figures 13, 14:
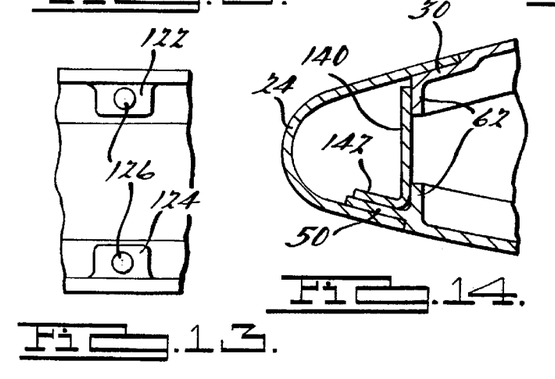
FIG. 13 is a view of the instant invention taken along the line 13—13 of FIG. 12.
FIG. 14 is a detail view of an alternative embodiment of the wing leading edge similar to FIG. 9.

As shown in FIGS. 11, 12 & 13, and in accordance with an alternative embodiment of the instant invention, both the upper 20 and the lower 40 wing boxes are further provided with a plurality of carry-through beams 120 extending laterally from the wing root 12 into the fuselage 16 of the aircraft to allow attachment of both wings 10 of the aircraft together. The carry-through beams 120 each have first and second flanges 122 and 124 respectively, each having a plurality of holes 126 therethrough. The first flange 122 is disposed proximate the wing root 12 and the second flange 124 is located at a point along the carry-through beam 120 proximate the opposite side of the fuselage 16. The flanges 122 and 124 on the upper wing box carry through beams 120 extend downwardly and the flanges 122 and 124 on the lower wing box carry through beams 120 extend upwardly.

As best seen in FIG. 12, the opposed carry-through beams 120 of the upper 20 and lower 40 wing boxes are secured together by interposing a filler segment 128 comprised of aluminum alloy therebetween. The filler segment 128 is welded to each opposing carry-through beam 120.

In the instant invention the carry-through beams 120 extending from one wing 10 of the aircraft are angled by approximately one degree either forward or aft of an axis normal to the wing root 12. The opposite wing 10 carry-through beams 120 are angled approximately one degree in the opposite direction. Angling the carry-through beams 120 slightly allows the beams 120 originating from opposite wings 10 of the aircraft to overlap each other. This feature of the instant invention allows one pair of carry-through beams 120 to be disposed forwardly of the corresponding pair of carry-through beams 120 of the opposite wing 10, thereby causing the flanges 122 and 124 thereon to lie in juxtaposed generally parallel spaced relation. Fasteners are inserted through the holes 126 in the flanges 122 and 124 to secure the corresponding carry-through beams 120 from opposing wings 10 together.

Additionally, a plurality of reinforcing struts 130 extending from a plurality of points along the wing root 12 proximate the carry-through beams 120 are machined into the interior 60 of each wing box 20 and 40. The reinforcing struts 130 extend at oblique angles to the wing stiffeners 80 and terminate at a plurality of points defined by the intersections of the rib 90 nearest the wing root 12 and a plurality of stiffeners 80. The wing skins 22 and 42 proximate the reinforcing struts 130 are machined to have additional localized thickness to dissipate the forces borne by the ribs 130. The reinforcing struts 130 are necessary to distribute the forces present in the carry-through beams 120 into the stiffeners 80.

In an alternative embodiment of the instant invention as shown in FIG. 14, the upper wing box 20 is provided with a rabbeted portion 30 disposed therein aft of the forward spar 62 extending laterally substantially along the entire length of the wing 10 from root 12 to tip 14. Similarly, the lower wing box 40 is also provided with a rabbeted portion 50 disposed therein forward of the forward spar 62 and extending laterally substantially along the entire length of the wing 10. In this embodiment, the leading edge 24 of the wing 10 is fabricated as a separate component from the upper wing box 20 and positioned to engage the rabbeted portions 30 and 50 of the upper 20 and lower 40 wing boxes respectively. The leading edge 24 is secured to the rabbeted portions 30 and 50 with rivets, screws or an equivalent fastener.

Additionally, and in accordance with an alternative embodiment of the instant invention, a splice plate 140 is provided in lieu of the intermediate spar 100, to connect the upper and lower forward spars 62 and provide support to the leading edge 24. The splice plate 140 extends laterally substantially along the entire length of the wing 10 and is provided with a flange 142 thereon. The splice plate flange 142 is riveted or alternatively bolted to the rabbeted portion 50 of the lower wing box 40, and to the forward spar 62 of the upper wing box 40. In this embodiment of the instant invention, the panel portion 110 is not utilized.

Figure 15:
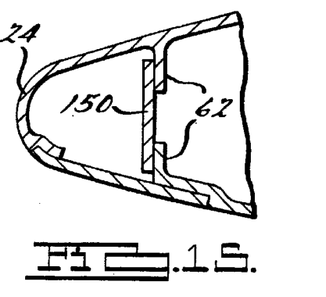
FIG. 15 is a detail view of an alternative embodiment of the wing leading edge similar to FIG. 14.

As shown in FIG. 15, yet another alternative embodiment of the instant invention provides for an intermediate spar 150 that is riveted or bolted to the forwards spars 62 to secure the forward spars together. This feature obviates the need for welding the interior spar 150 to forward spars 62 where the integral leading edge 24 makes it difficult for welding equipment access.

While the preferred embodiment- of the instant invention has been disclosed in detail, it will be appreciated by one of ordinary skill in the art that the instant invention is susceptible to various modifications without departing from the scope of the following claims.

What is claimed is:

1. A forward-swept wing for an aircraft having a fuselage comprising:
  an upper wing box machined from an aluminum alloy workpiece comprising;
    an upper wing skin defining an upper surface of an airfoil including a wing leading edge thereon, the leading edge having an upper portion and a lower rabbeted portion terminating at a point below the stagnation region of said wing;

a forward spar proximate the leading edge of said wing extending laterally from wing root to wing tip, the forward spar further extending downwardly to the maximum thickness of said workpiece;

a rear spar extending laterally from wing root to wing tip and arranged in generally parallel spaced relation to the forward spar;

a plurality of stiffeners disposed between the forward spar and the rear spar at a forwardly swept angle of approximately 13 degrees to a laterally extending central axis of said wing to minimize aeroelastic divergence thereof;

a plurality of ribs extending between the forward spar and the rear spar at an angle of approximately 90 degrees to the mean chord line of said wing; and a lower wing box machined from an aluminum alloy workpiece comprising;

a lower wing skin defining a lower surface of an airfoil;

a forward spar proximate the leading edge of said wing extending laterally from wing root to wing tip, said forward spar further extending upwardly to the maximum thickness of said workpiece;

a rear spar extending laterally from wing root to wing tip and arranged in generally parallel spaced relation to the forward spar;

a plurality of stiffeners disposed between the forward spar and the rear spar at a forwardly swept angle of approximately 13 degrees to a laterally extending central axis of said wing to minimize aeroelastic divergence thereof;

a plurality of ribs disposed between the forward spar and the rear spar at an angle of approximately 90 degrees to the mean chord line of said wing; and an intermediate spar interposed between and welded to the forward spar of said lower wing box and the forward spar of said upper wing box for providing sufficient thickness to the leading edge of said wing.

2. The wing of claim 1 wherein said plurality of ribs of said upper and lower wing boxes respectively, are disposed between the forward and rear spars thereof parallel to the centerline of the fuselage of said aircraft.

3. The wing of claim 1 wherein the plurality of ribs of said upper and lower wing boxes further comprise an interior edge having an end cap portion disposed thereon to provide additional rigidity and strength to each rib.

4. The wing of claim 1 wherein the plurality of stiffeners of said upper and lower wing boxes further comprise an interior edge having an end cap portion disposed thereon to provide additional rigidity and strength to each rib.

5. The wing of claim 1 wherein the plurality of ribs of said upper and lower wing boxes further have a plurality of holes therein for venting and draining fuel from said wing.

6. The wing of claim 2 wherein the plurality of ribs of said upper and lower wing boxes further have a plurality of holes therein for venting and draining fuel from said wing.

7. The wing of claim 1 wherein the rear spars of said upper and lower wing boxes further have a plurality of bosses thereon for securing wing flaps and ailerons thereto.

8. The wing of claim 1 further comprising a panel portion extending laterally substantially the entire length of said wing secured to the lower rabbeted portion of the leading edge and the forward spar of said lower wing box, wherein a channel for installation of aircraft flight systems is defined by said panel portion, the forward spars of said wing boxes, and said leading edge.

9. The wing of claim 8 wherein said intermediate spar is bolted to the forward spars of said upper and lower wing boxes.

10. The wing of claim 8 wherein said intermediate spar is riveted to the forward spars of said upper and lower wing boxes.

11. The wing of claim 1 wherein said upper wing box further comprises:

a plurality of carry-through beams extending laterally from said wing root into the fuselage of said aircraft having a plurality of downwardly extending flanges disposed thereon, each flange having a hole therein for acceptance of a fastener;

a plurality of reinforcing struts extending from a point on said wing root proximate the carry-through beams to a plurality of points defined by the intersections of the rib nearest said wing root and the plurality of stiffeners;

and wherein said lower wing box further comprises:

a plurality of carry-through beams extending laterally from said wing root into the fuselage of said aircraft having a plurality of upwardly extending flanges disposed thereon, each flange having a hole therein for acceptance of a fastener;

a plurality of reinforcing struts extending from a point on said wing root proximate the carry-through beams to a plurality of points defined by the intersections of the rib nearest said wing root and the plurality of stiffeners; and a plurality of filler segments interposed between and welded to the plurality of carry-through beams of said lower wing box and the plurality of carry-through beams of said upper wing box.

12. The wing of claim 11 wherein said plurality of carry-through beams extend laterally into the fuselage at an angle of approximately 1 degree forward of an axis normal to the wing root thereby allowing the flanges disposed on carry-through beams of opposing aircraft wings to lie in juxtaposed generally spaced relation.

13. The wing of claim 11 wherein said plurality of carry-through beams extend laterally into the fuselage at an angle of approximately 1 degree aft of an axis normal to the wing root thereby allowing the flanges disposed on carry-through beams of opposing aircraft wings to lie in juxtaposed generally spaced relation.

14. A forward-swept wing for an aircraft having a fuselage comprising:

an upper wing box machined from an aluminum alloy workpiece comprising;

an upper wing skin defining an upper surface of an airfoil;

a forward spar proximate the leading edge of said wing extending laterally from wing root to wing tip, said forward spar further extending downwardly to the maximum thickness of said workpiece;

a rear spar extending laterally from wing root to wing tip and arranged in generally parallel spaced relation to the forward spar;

a plurality of stiffeners disposed between the forward spar and the rear spar at a forwardly swept angle of approximately 13 degrees to a laterally extending central axis of said wing to minimize aeroelastic divergence thereof;

a plurality of ribs extending between the forward spar and the rear spar at an angle of approximately 90 degrees to the mean chord line of said wing;

a rabbeted portion extending substantially along the entire length of said wing box disposed aft of the forward spar thereof; and a lower wing box machined from an aluminum alloy workpiece comprising;

a lower wing skin defining a lower surface of an airfoil;

a forward spar proximate the leading edge of said wing extending laterally from wing root to wing tip, said forward spar further extending upwardly to the maximum thickness of said workpiece;

a rear spar extending laterally from wing root to wing tip and arranged in generally parallel spaced relation to the forward spar;

a plurality of stiffeners disposed between the forward spar and the rear spar at a forwardly swept angle of approximately 13 degrees to a laterally extending central axis of said wing to minimize aeroelastic divergence thereof;

a plurality of ribs disposed between the forward spar and the rear spar at an angle of approximately 90 degrees to the mean chord line of said wing;

a rabbeted portion extending substantially along the entire length of said lower wing box disposed forward of the forward spar thereof; and an intermediate spar interposed between and welded to the forward spar of said lower wing box and the forward spar of said upper wing box for providing sufficient thickness to the leading edge of said wing; and a wing leading edge having an upper portion secured to the rabbeted portion of said upper wing box and a lower rabbeted portion terminating at a point below the stagnation region of said wing secured to the rabbeted portion of said lower wing box.

15. The wing of claim 14 wherein said intermediate spar comprises a splice plate extending substantially the entire length of said wing having a flange thereon to engage the rabbeted portion of said lower wing box, said splice plate secured to the forward spars of said upper and lower wing boxes.

16. The wing of claim 14 wherein said upper wing box further comprises:

a plurality of carry-through beams extending laterally from said wing root into the fuselage of said aircraft having a plurality of downwardly extending flanges disposed thereon, each flange having a hole therein for acceptance of a fastener;

a plurality of reinforcing struts extending from a point on said wing root proximate the carry-through beams to a plurality of points defined by the intersections of the rib nearest said wing root and the plurality of stiffeners;

and wherein said lower wing box further comprises:

a plurality of carry-through beams extending laterally from said wing root into the fuselage of said aircraft having a plurality of upwardly extending flanges disposed thereon, each flange having a hole therein for acceptance of a fastener;

a plurality of reinforcing struts extending from a point on said wing root proximate the carry-through beams to a plurality of points defined by the intersections of the rib nearest said wing root and the plurality of stiffeners; and a plurality of filler segments interposed between and welded to the plurality of carry-through beams of said lower wing box and the plurality of carry-through beams of said upper wing box.

17. The wing of claim 16 wherein said plurality of carry-through beams extend laterally into the fuselage at an angle of approximately 1 degree forward of an axis normal to the wing root thereby allowing the flanges disposed on carry-through beams of opposing aircraft wings to lie in juxtaposed generally spaced relation.

18. The wing of claim 16 wherein said plurality of carry-through beams extend laterally into the fuselage at an angle of approximately 1 degree aft of an axis normal to the wing root thereby allowing the flanges disposed on carry-through beams of opposing aircraft wings to lie in juxtaposed generally spaced relation.

* * * * *